United States Patent
Grube et al.

(10) Patent No.: US 7,961,137 B2
(45) Date of Patent: Jun. 14, 2011

(54) SYSTEM AND METHOD FOR DETECTING PERFORMANCE OF A SENSOR FIELD AT ALL POINTS WITHIN A GEOGRAPHIC AREA OF REGARD

(75) Inventors: Robert William Grube, Edmonds, WA (US); Raju Mattikalli, Sammamish, WA (US); Paul Zack Thunemann, Snoqualmie, WA (US)

(73) Assignee: The Boeing Company, Chicago, IL (US)

( * ) Notice: Subject to any disclaimer, the term of this patent is extended or adjusted under 35 U.S.C. 154(b) by 242 days.

(21) Appl. No.: 12/267,836

(22) Filed: Nov. 10, 2008

(65) Prior Publication Data
US 2010/0117889 A1 May 13, 2010

(51) Int. Cl.
*G01S 13/58* (2006.01)
(52) U.S. Cl. .............................. 342/59; 342/28; 340/552
(58) Field of Classification Search ...................... 342/59
See application file for complete search history.

(56) References Cited

U.S. PATENT DOCUMENTS

| | | | |
|---|---|---|---|
| 6,917,855 B2 * | 7/2005 | Gonzalez-Banos et al. | 700/245 |
| 2003/0058342 A1 * | 3/2003 | Trajkovic | 348/207.1 |
| 2008/0198004 A1 * | 8/2008 | Luss | 340/539.26 |
| 2009/0015460 A1 * | 1/2009 | Fox et al. | 342/53 |
| 2010/0017114 A1 * | 1/2010 | Tehan et al. | 701/202 |

OTHER PUBLICATIONS

Optimal Sensor Selection and Placement for Perimeter Defense, Raju Mattikalli, et al. Proceedings of the 3rd Annual, IEEE Conference on Automation Science and Engineering, Scottsdale, AZ, USA, Sep. 22-25, 2007.

* cited by examiner

*Primary Examiner* — Thomas H Tarcza
*Assistant Examiner* — Matthew M Barker
(74) *Attorney, Agent, or Firm* — Harness, Dickey & Pierce, P.L.C.

(57) ABSTRACT

A method for determining a path of travel of an intruder traversing an area of regard (AOR) to a predefined point, where the path of travel has a minimum probability of detection relative to other potential paths of travel of the intruder. The method may comprise: providing three dimensional terrain data concerning the AOR; providing the locations of a plurality of detection sensors implemented in the AOR, with each detection sensor having a known field of view; providing a predetermined single scan detection probability for each of the detection sensors; generating a grid of points that is laid over the AOR; and using the foregoing information to determine a particular path of travel, defined by selected arcs connecting specific ones of the grid of points, of the intruder to the predefined point that represents a minimum probability of detection of the intruder.

20 Claims, 4 Drawing Sheets

US 7,961,137 B2

SYSTEM AND METHOD FOR DETECTING PERFORMANCE OF A SENSOR FIELD AT ALL POINTS WITHIN A GEOGRAPHIC AREA OF REGARD

FIELD

The present disclosure relates to sensor systems for detecting the movement of individuals or objects within a predefined geographic area, and more particularly to a system and method for gauging the ability of such a system to detect an object or individual at any point within the predetermined geographic area.

BACKGROUND

The statements in this section merely provide background information related to the present disclosure and may not constitute prior art.

At the present time there is increasing interest in developing computational capability to automatically design an optimal sensor lay down for border security. In one embodiment the border security application involves detecting illegal human and vehicular border intruders using a set of scanning radars. However, at present there is no satisfactory system-level measure of the detection performance of such radars. If some system-level detection performance existed, then one could use the results of such detection performance to optimize the lay down of the collection of radars over a predefined geographic area, sometimes referred to as an "area of regard" ("AOR").

It is becoming increasingly clear, both in the academic research community, and in industrial practice, that system configuration design and utilization of sensors requires a good statistical model of the environment and the performance of the sensors being used. One existing solution to evaluate sensor detection performance computes the cumulative detection probability by performing a time consuming Monte-Carlo simulation. The simulation moves intruders on pre-computed paths over the terrain. The single scan detection probability is computed for each periodic scan of a target by simulating the roll of a dice. Additional single-scan detections are sequentially obtained by forwarding the location of the intruder at radar revisit intervals. To overcome false alarms in high clutter environments, typical signal processing pipelines on sensors use detection schemes such as three consecutive or m-of-n single scan detections before externally reporting a detection. To model these, if three consecutive (or m of n) positive outcomes are obtained in the Monte-Carlo simulation at any location, then that location is said to have recorded a detection. Many hundreds of such simulations are repeated to obtain statistically reliable figures on detection probability at all points on the paths.

Note that a significant weakness of the existing method is that detection probabilities are obtained only on points on the paths; there is no detection probability provided over the entire terrain (AOR). Regions outside the specified paths are completely inconsequential to the computation of the metric. This presents a significant technical weakness because detection performance cannot be gauged at all points within an AOR but rather only along the specified paths.

Another drawback with the previously described Monte-Carlo simulation process is that it is time consuming to perform. This makes it difficult (if not impossible) to use such a solution in system design optimization, where possibly many millions of alternate designs may need to be evaluated.

SUMMARY

In one aspect the present disclosure relates to a method for determining a path of travel of an intruder traversing an area of regard (AOR) to a predefined point, where the path of travel has a minimum probability of detection relative to other potential paths of travel of the intruder. The method may comprise: providing three dimensional terrain data concerning the area of regard; providing the locations of a plurality of detection sensors implemented in the area of regard, with each said detection sensor having a known field of view; providing a predetermined single scan detection probability for each of the detection sensors; generating a grid of points that is laid over the area of regard; and using the grid of points, the three dimensional terrain data, and the predetermined single scan detection probability for each of the detection sensors, to determine a particular path of travel, defined by arcs connecting selected ones of the grid of points, of the intruder to the predefined point that represents a minimum probability of detection of the intruder relative to all other potential paths of travel through the area of regard to the predefined point.

In another aspect the present disclosure relates to a method for determining a path of travel of an intruder traversing an area of regard (AOR) to a predefined point, where the path of travel has a minimum probability of detection relative to other potential paths of travel of the intruder. The method may comprise: providing three dimensional terrain data concerning the area of regard; providing the location of each one of a plurality of detection radar sensors located at spaced apart locations within the area of regard; providing a predetermined single scan detection probability for each said detection radar sensor; defining a valid detection by each of the detection radar sensors as comprising more than one detection while the intruder is moving within a field of view of a given one of the detection radar sensors; generating a grid of points over the area of interest; using the grid of points, the three dimensional terrain data, the outputs from the detection sensors and the predetermined single scan detection probability for the detection sensor to determine a particular path of travel of the intruder through the AOR, defined by selected ones of the grid of points, that represents a minimum probability of detection of the intruder relative to all other potential paths of travel through the AOR to the predefined point.

In another aspect the present disclosure relates to a system for monitoring a geographic area of regard (AOR) and determining a path of travel of an intruder traversing an area of regard (AOR) to a predefined point, where the path of travel has a minimum probability of detection relative to other potential paths of travel of the intruder. The system may comprise: a plurality of detection sensors located at known, predetermined locations within the area of regard, each said detection sensor having a known field of view;

each said detection sensor having a predetermined single scan probability of detecting the intruder as the intruder moves within the field of view of the detection sensor; a processor adapted to:

generate a grid of points over a map of the AOR, with the detection sensors laid out on the map; and to use known three dimensional terrain data of the AOR and outputs from each of the detection sensors to determine a particular path of travel, defined by selected ones of the grid of points, of the intruder to the predefined point that represents a minimum probability of detection of the intruder relative to all other potential paths of travel through the area of regard to the predefined point.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
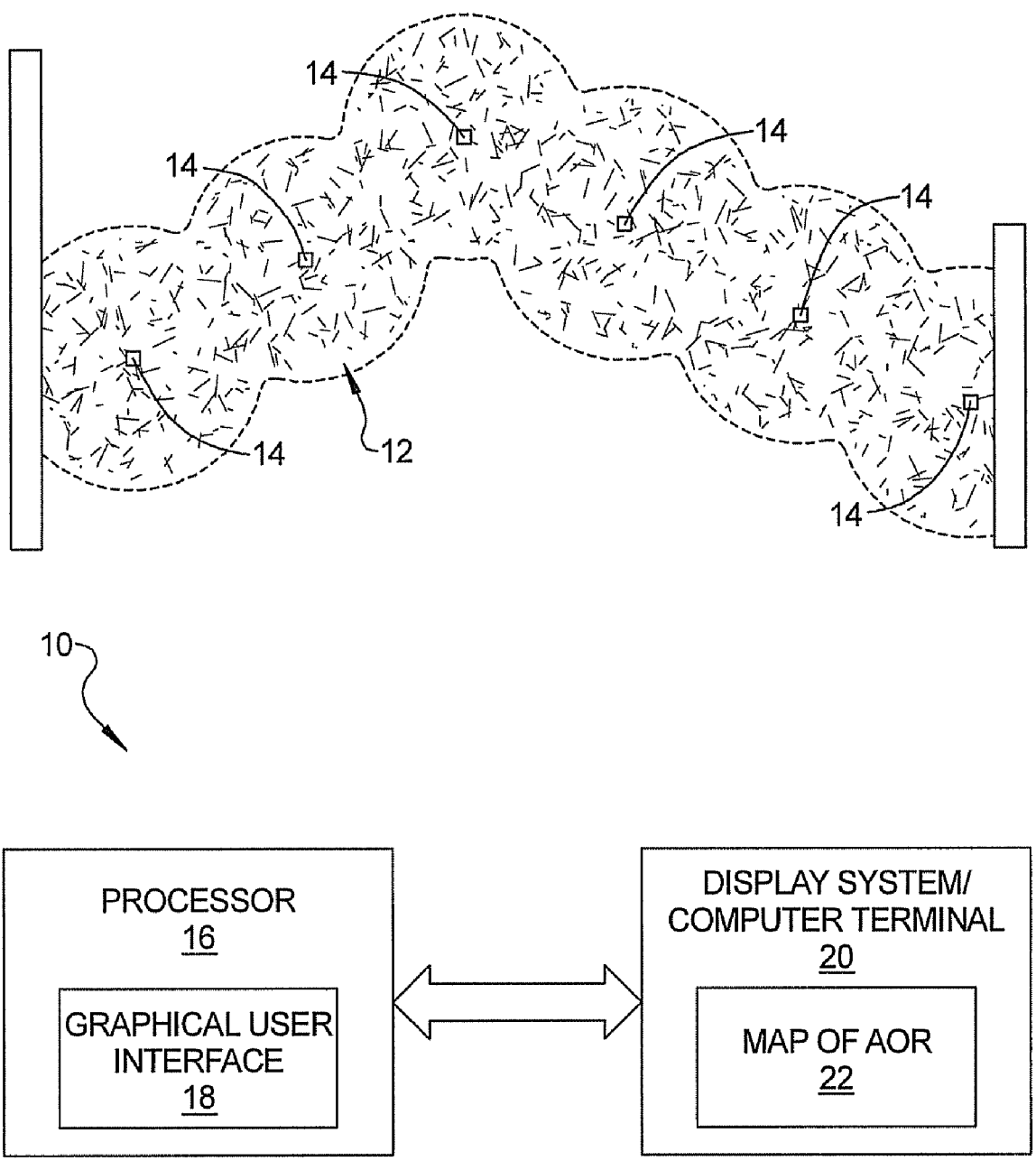
FIG. 1 is a block diagram of one embodiment of the system making use of a plurality of detection sensors laid out over an area of regard (AOR)

The following description is merely exemplary in nature and is not intended to limit the present disclosure, application, or uses. It should be understood that throughout the drawings, corresponding reference numerals indicate like or corresponding parts and features.

Referring to FIG. 1 there is shown a system 10 in accordance with one embodiment of the present disclosure for determining a specific path through a geographic area of regard (AOR) 12, where the specific path has a minimum probability of enabling detection of an intruder traversing the AOR 12 from a point of origin (i.e. start point) to a predetermined destination point. Monitoring of the AOR 12 is accomplished by a plurality of detection sensors 14 that may each comprise radar units that periodically scan a predetermined line-of-sight field of view, also thus each have what is known in the art as a "viewshed".

Figure 2:
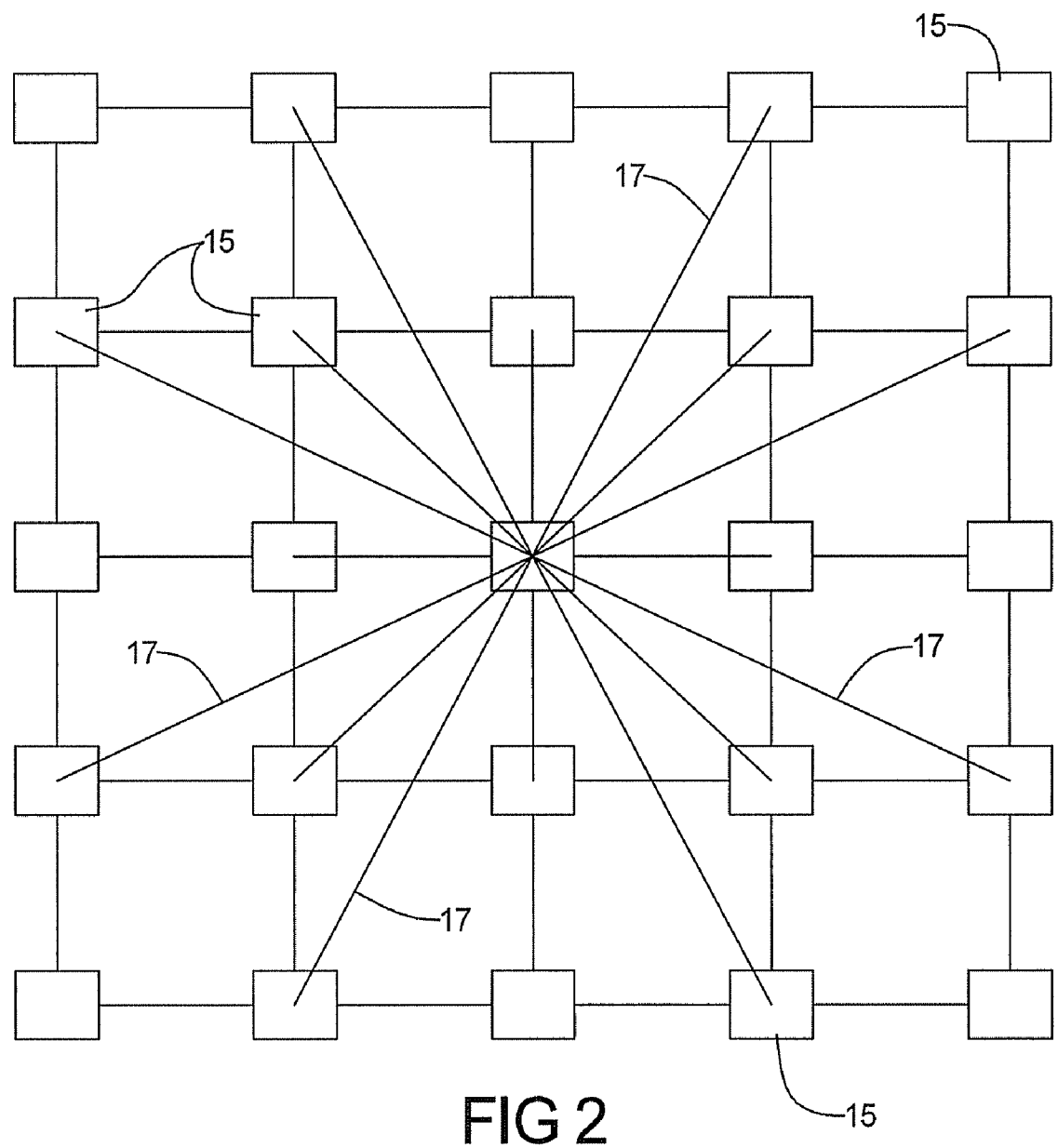
FIG. 2 is an enlarged portion of the AOR shown in FIG. 1 with nodes shown, and also with arcs draw in from one specific node, where the arcs represent segments that may form one or more portions of a path of travel through the AOR.

As will be described in greater detail in the following paragraphs, the system 10 is also able to determine the cumulative probability of detection of the intruder for any path taken by the intruder within the AOR 12. Thus, the system 10 not only determines that specific path of travel within the AOR 12 where the probability of detecting the intruder is the lowest, but also is able to determine the probability of detecting the intruder along any path within the AOR, where the various paths are defined by a grid of points laid over the AOR with arcs connecting selected ones of the grid points. This grid of points can be made arbitrarily dense depending on computational resources available. FIG. 2 shows an enlarged portion of the AOR 12 of FIG. 1 where grid points have been overlayed on the map of the AOR 12. Each grid point can be thought of as a "node" in a graph, referred to as the detection graph, and is labeled with reference numeral 15. In this example a single "segment" can be understood as a line or "arc" 17 in the graph that forms a portion of a path of travel of the intruder between two nodes 15. Thus, a path of travel within the AOR 12 will typically be formed by a plurality of connected arcs (i.e., segments) that collectively form a typically somewhat meandering path from one boundary of the AOR 12 to a destination point at a different boundary of the AOR 12. In the exemplary node layout in FIG. 2, from any given node 15 there is a possibility of sixteen different arcs 17. However, with a more dense or less dense grid point nodes, this number of arcs 17 could be higher or lower. Each arc 17 may be viewed as representing a single segment of possible travel within the AOR 12.

Referring further to FIG. 1, the system 10 may include a processor 16 having a graphical user interface 18 by which a user may input various information required by the system 10. The graphical user interface 18 may take the form of a software program that is displayed on a display system 20. The display system 20 may comprise a cathode ray tube (CRT), liquid crystal display (LCD) or any other form of display capable of displaying graphical information. The display system 20 may display various input screens used by the graphical user interface 18 as well as a map 22 of the AOR 12 with or without the detection sensors 14 displayed thereon. The display system 20 may also be used to display the grid of points as an overlay on the map 22, as well as to display a path of travel through the AOR 12 that will provide the minimum probability of detection by the detection sensors 14, or alternatively any other path of travel of the intruder with the calculated probability of detection of the intruder along that particular path of travel. However, identifying that particular path of travel of the intruder from one boundary of the AOR 12 to a destination point at a different boundary of the AOR, that will have the minimum probability of detection by the detection sensors, is an extremely valuable tool when designing a monitoring system to monitor a given geographic area. The system 10 also enables the lay down of detection sensors 14 to be optimized when considering the topography of the AOR 12 to achieve a desired minimum level of probability of detection of an intruder travelling through the AOR 12. By "optimized" it is meant achieving the highest minimum probability of detection considering the number and type of detection sensors 14 being used, the topography and the dimensions of the AOR 12.

The system 10 initially is provided with a single scan detection probability ($P_{ssd}$) function. The $P_{ssd}$ is the likelihood that a single scan of a given detection sensor (i.e., radar) will generate a "detection" of the intruder. Depending on the type of sensor, a number of influencing factors contribute to $P_{ssd}$, for example the type of intruder (e.g., human on foot travel; vehicle, et.); the weather around the detection sensor 14; the topography of the AOR 12, foliage and clutter on the AOR 12, and the component of the intruder's instantaneous speed of travel in the direction of the detection sensor 14. To ensure against false positive detections, a given detection sensor 14 preferably must indicate a plurality of detections of the intruder along a given arc (i.e., segment) of travel of the intruder within the viewshed of the sensor 14. For example, a rule may be implemented where a given sensor 14 must indicate thee consecutive detections or "M-of-N" detections. For an "M-of-N" detection rule, for example, it may be required that the sensor 14 indicates 3 detections out of a maximum possible 5 detections as the intruder travels within its viewshed. Mathematically this can be expressed as follows:

let "Detect" be a binomial random variable either "T" (true) or "F" (false);
let Detect have a $P_{ssd}$% chance of taking the value T;
let there be n independent scans of the sensor 14 during the time frame that the intruder traverses a single arc (i.e., segment) that passes through the viewshed of the sensor 14;

the probability of obtaining M-of-N Ts can be expressed as:

$${}^nC_m(P_{ssd})^m(1-\text{Pssd})^{n-m}$$

The probability of obtaining (M+1)-of-N Ts can be similarly obtained. Other mathematical computations of a similar nature provide the probability of obtaining q consecutive detections.

The "cumulative detection probability" (CPD) of the intruder along a given path having n segments can be defined as the cumulative probability that the intruder will be detected at least once while traversing one of the n segments during travel along a path defined by the n segments. If $P_{d_i}$ is the detection probability along the i-th segment, the CPD for a given path through the AOR 12 can be defined by the formula:

$$CPD(\text{path}) = 1 - \prod_{i=1}^{n}(1-P_{d_i})$$

It will be noted that the CPD along a given path will be non-decreasing. Put differently, as the intruder traverses one segment after another, the cumulative probability of being detected at some segment along the path increases (or is constant) as the total number of segments increases. Thus, an intruder traversing a path with 10 segments will have a higher or equal cumulative probability of being detected by the system 10 than if the intruder traversed only the first two segments of the same 10 segment path.

The system 10 provides the advantage of being able to use the above formulas to calculate the CPD for any potential paths between one boundary of the AOR 12 and a different boundary. Furthermore, detection probability along each arc can be used as weights on arcs in the detection graph to obtained a weighted detection graph. Minimum detection paths in the AOR 12 can now be obtained by computing shortest paths in the weighted detection graph using the well known Dijkstra's min-path algorithm. A significant advantage is that the system 10, can determine that specific path from any starting point at one boundary of the AOR 12 to a destination point at a different boundary that has the minimum CPD (termed the "MPD" for "minimum path detect") of all the possible paths between the two boundaries. The ability to know the MPD is highly valuable to evaluating an existing lay down (i.e., arrangement) of sensors in a given AOR because it provides the lower bound on the detection performance of a lay down. It is also highly valuable to a designer who is attempting to design a detection system and needs to know the effectiveness of a proposed lay down of sensors of a detection system being implemented within a given AOR.

Figure 3:
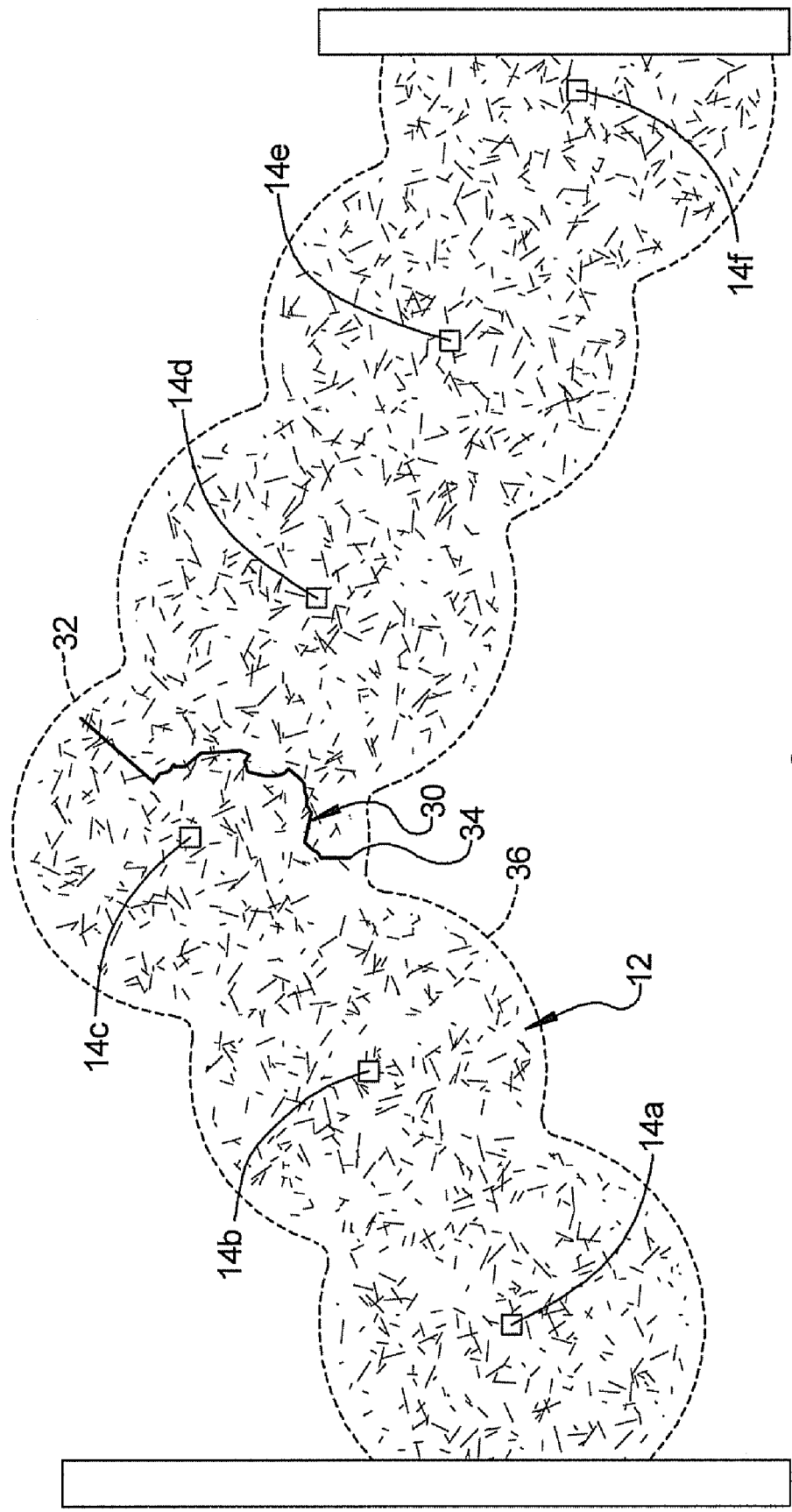
FIG. 3 illustrates a path through a particular AOR that the system has calculated as representing the specific path having the minimum cumulative probability of detection (the "MPD") for all potential paths through the AOR.

An example of a MPD determined by the system 10 is shown in FIG. 3. It will be appreciated that the embodiment shown in FIG. 3 represents a highly simplified arrangement of sensors 14 within the AOR 12. The size and topography of the AOR 12, as well as the estimated speed of travel of the intruder and the means of travel (walking, travelling by motor vehicle) and potentially other factors will also play a role in determining the total number of sensors 14 selected for use in the AOR 12. Thus, while only six sensors 14 are illustrated within the AOR 12, typically dozens, hundreds or even thousands of sensors 14 may be employed in an AOR, such as along border area.

In FIG. 3 the MPD is denoted by a line marked with reference numeral 30. The sensors 14 are labeled as sensors 14a through 14f. The viewsheds of each sensor 14a-14f in this example are shown with stippling and overlap one another slightly. Each viewshed represents the area that its associated sensor 14 has clear lines of sight within. The path of travel of the intruder begins at one boundary 32 of the AOR 12 and ends at a specific destination point 34 along a different boundary 36. Thus, the MPD 30 represents that specific path through the AOR 12, of all potential paths through the AOR 12, where the cumulative detection probability (CPD) is the very minimum. Put differently, all other potential paths of travel through the AOR 12 from boundary 32 to boundary 36 would have a greater or equal cumulative probability of detection than the MPD 30.

It will be appreciated that other tangibles that influence how quickly and/or easily the intruder travels through the AOR 12 could be easily factored in to the calculation of the CPD. Such tangibles could include the degree of solar exposure of the intruder or the calorific burn sustained by the intruder while travelling through the AOR 12, as well as whether the intruder is likely to be travelling frequently on sections of paved road(s) within the AOR. All of these factors may influence how quickly the intruder moves through the AOR 12.

The system 10 allows the designer to either add or delete sensors at specific points within the AOR to raise the MPD to a desired minimum level, for example 0.95. It is expected that in many instances the system designer will want a MPD of at least about 0.95 to assure detection of an intruder traversing the AOR.

Figure 4:
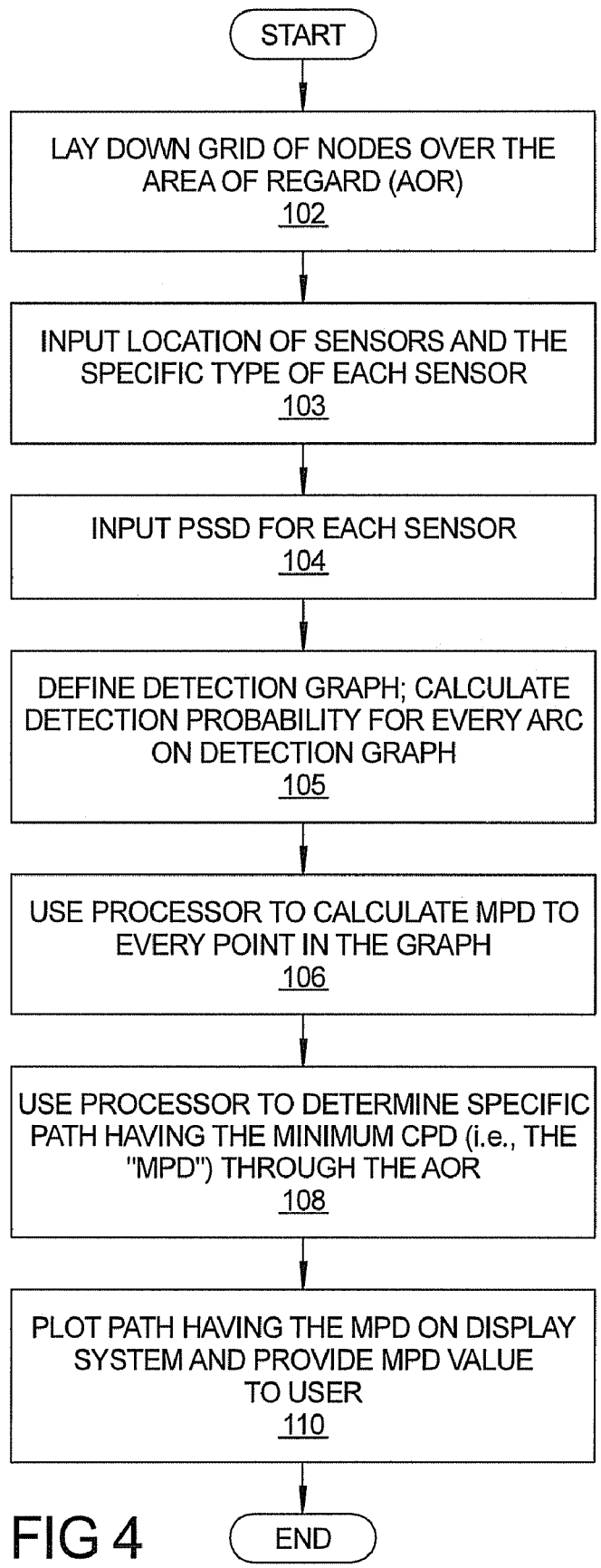
FIG. 4 is a flowchart illustrating operations performed by the system in determining the MPD.

Referring to FIG. 4, a flowchart 100 is shown that sets forth various operations that may be performed by the system 10. At operation 102 the processor 16 lays down a grid of nodes 15 over the AOR 12. At operation 103, locations of sensors and their type are input. At operation 104 the $P_{ssd}$ of each sensor is input to the processor 16. It will be appreciated that each sensor 14 will typically have implemented an "n consecutive" or "M-of-N" scheme as described herein by which it will only generate an output when the detection scheme has been satisfied. At operation 105, the detection probability for every arc on the detection graph is computed. This value of detection probability computed for each arc is assigned as its weight. At operation 106, at every point in the AOR 12, the path with the minimum detection probability from one AOR boundary (the boundary where intruders enter the AOR) to that point is computed. The CPD value associated with that minimum path (i.e. the MPD value) is also computed at this operation. At operation 108 the processor 16 determines the point on the other boundary (the boundary where intruders exit the AOR 12) with the minimum MPD value. The minimum detection path corresponding to that point is computed; it represents the path with the least detection probability over the entire AOR 12. At operation 110 the path with the least detection probability over the entire AOR 12 is plotted on the display system 20 and the specific calculated MPD value may also be presented on the display system.

The system 10 also provides the significant advantage of not requiring specific paths of the intruder to be input into the system. Preexisting detection systems have typically required the system designer to select specific paths in an attempt to "find" that path that would have the lowest probability of detection. The system 10 is able to analytically calculate the probability of detecting the intruder along all potential baths through the AOR 12. The system 10 is also able to do this faster than previously existing systems that require a time consuming Monte Carlo simulation to be performed on preselected paths. The previously developed systems also may be limited to providing detection probabilities only at specific points on one or more preselected paths, where the system 10 is able to provide a cumulative probability of detection over an entire potential path of travel of the intruder, and for all such potential paths of travel through the entire area of the AOR 12. The system 10 thus is able to optimize the lay down of sensors 14 not by visibility of coverage, but rather by detection effectiveness. In some instances, it is expected that the system 10 will enable a designer to determine a sensor lay down for a given AOR that makes use of fewer sensors than would otherwise be determined by previous systems.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for determining a path of travel of an intruder traversing an area of regard (AOR) to a predefined point, where the path of travel has a minimum probability of detection relative to other potential paths of travel of the intruder, the method comprising:
   providing three dimensional terrain data concerning the area of regard;
   providing the locations of a plurality of detection sensors implemented in the area of regard, with each said detection sensor having a known field of view;
   providing a predetermined single scan detection probability for each of the detection sensors;
   generating a grid of points that is laid over the area of regard;
   using a computer processor to consider the grid of points, the three dimensional terrain data, and the predetermined single scan detection probability for each of the detection sensors, and to determine a particular path of travel, defined by arcs connecting selected ones of said grid of points, of said intruder to said predefined point that represents a minimum probability of detection of said intruder relative to all other potential paths of travel through said area of regard to said predefined point.

2. The method of claim 1, wherein said using the grid points includes considering multiple scans of a selected one of said sensors and defining a detection of said intruder between any two of said grid points that define a single segment of said particular path of travel, as comprising three consecutive detections of said intruder by the sensor.

3. The method of claim 1, wherein said using the grid points includes considering multiple scans of a selected one of said sensors and defining a detection of said intruder between any two of said grid points that define a single segment of said particular path of travel, as comprising M of N detections, where M represents a detection and N represents a number of total attempted detections.

4. The method of claim 1, further comprising:
   using a plurality of said detection sensors dispersed within said AOR; and
   using information from said plurality of sensors to determine a cumulative detection probability (CPD) of detecting said intruder along a specific path that said intruder traverses within said AOR from an origin to said predefined point.

5. The method of claim 1, wherein said providing a single scan detection probability comprises further assigning a velocity vector to movement of said intruder as said intruder moves through said AOR.

6. The method of claim 5, further comprising considering a topography of said AOR when considering said likely rate of movement of said intruder.

7. The method of claim 6, further considering weather conditions within said AOR in providing said single scan detection probability.

8. The method of claim 1, further considering a degree of solar exposure that said intruder is likely to be exposed to in traversing said AOR, when considering said likely rate of movement of said intruder.

9. The method of claim 1, wherein said providing a single scan detection probability for a given one of said detection sensors comprises considering at least one of:
   weather conditions within said AOR;
   a velocity vector of the intruder relative to said given one of said detection sensors; and
   whether said intruder comprises a vehicle or an individual travelling on foot.

10. A method for determining a path of travel of an intruder traversing an area of regard (AOR) to a predefined point, where the path of travel has a minimum probability of detection relative to other potential paths of travel of the intruder, the method comprising:
    providing three dimensional terrain data concerning the area of regard;
    providing the location of each one of a plurality of detection radar sensors located at spaced apart locations within the area of regard;
    providing a predetermined single scan detection probability for each said detection radar sensor;
    defining a valid detection by each of said detection radar sensors as comprising more than one detection while said intruder is moving within a field of view of a given one of said detection radar sensors;
    generating a grid of points over the area of interest;
    using a computer processor to consider the grid of points, the three dimensional terrain data, the outputs from the detection sensors and the predetermined single scan detection probability for the detection sensor, and to determine a particular path of travel of said intruder through said AOR, defined by selected ones of said grid of points, that represents a minimum probability of detection of said intruder relative to all other potential paths of travel through said AOR to said predefined point.

11. The method of claim 10, wherein said defining a valid detection comprises defining three consecutive detections of said intruder by a given one of said detection radar sensors while said intruder is within said field of view of said given one of said detection radar sensors.

12. The method of claim 10, wherein said defining a valid detection comprises M of N detections by a given one of said detection radar sensors, where M represents a detection by said given one of said detection radar sensors, and N represents a number of total attempted detections by said given one of said detection radar sensors.

13. The method of claim 10, further comprising using information from a select group of said detection radar sensors to determine a cumulative detection probability (CPD) of detecting said intruder along a specific path, defined by said select group of detection radar sensors, that said intruder traverses within said AOR from an origin to said predefined point.

14. The method of claim 10, wherein said providing a single scan detection probability for a given, one of said detection radar sensors comprises considering at least two of:
    weather conditions within said AOR;

a velocity vector of the intruder relative to said given one of said detection sensors; and whether said intruder comprises a vehicle or an individual travelling on foot.

15. The method of claim 10, further considering a topography of said AOR when providing said single scan detection probability.

16. The method of claim 10, further comprising determining a cumulative probability of detection for at least two different paths of travel through said AOR, where each said different path of travel is made up of a plurality of distinct segments.

17. A system for monitoring a geographic area of regard (AOR) and determining a path of travel of an intruder traversing an area of regard (AOR) to a predefined point, where the path of travel has a minimum probability of detection relative to other potential paths of travel of the intruder, the system comprising:

a plurality of detection sensors located at known, predetermined locations within said area of regard, each said detection sensor having a known field of view;

each said detection sensor having a predetermined single scan probability of detecting said intruder as said intruder moves within said field of view of said detection sensor;

a processor adapted to:

generate a grid of points over a map of said AOR, with said detection sensors laid out on said map; and to use known three dimensional terrain data of said AOR and outputs from each of the detection sensors to determine a particular path of travel, defined by selected ones of said grid of points, of said intruder to said predefined point that represents a minimum probability of detection of said intruder relative to all other potential paths of travel through said area of regard to said predefined point.

18. The system of claim 17, further comprising a display for displaying said detection sensors, said AOR and a path of travel representing said minimum probability of detection.

19. The system of claim 17, wherein each said detection sensor comprises a radar.

20. The system of claim 17, wherein said processor is adapted to calculate a cumulative probability of detection for any paths of travel through said AOR by said intruder, and to identify said particular path of travel having said minimum probability of detection.

* * * * *